C. J. DROPE.
TIRE.
APPLICATION FILED FEB. 8, 1919.
1,346,081. Patented July 6, 1920.
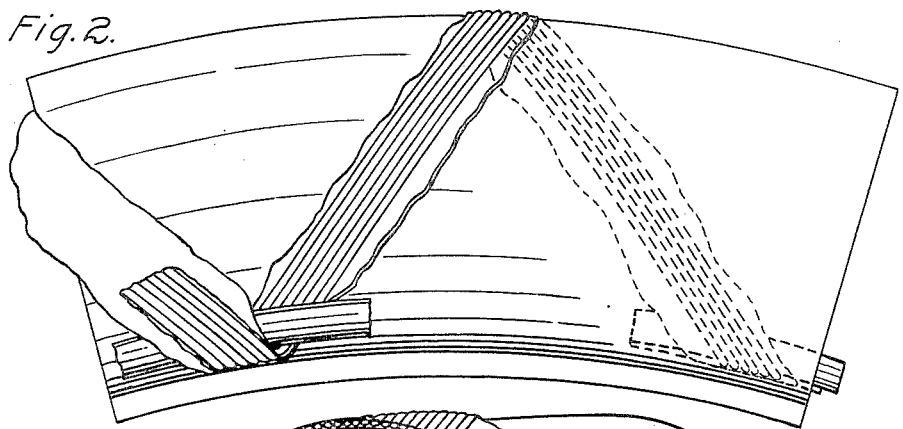
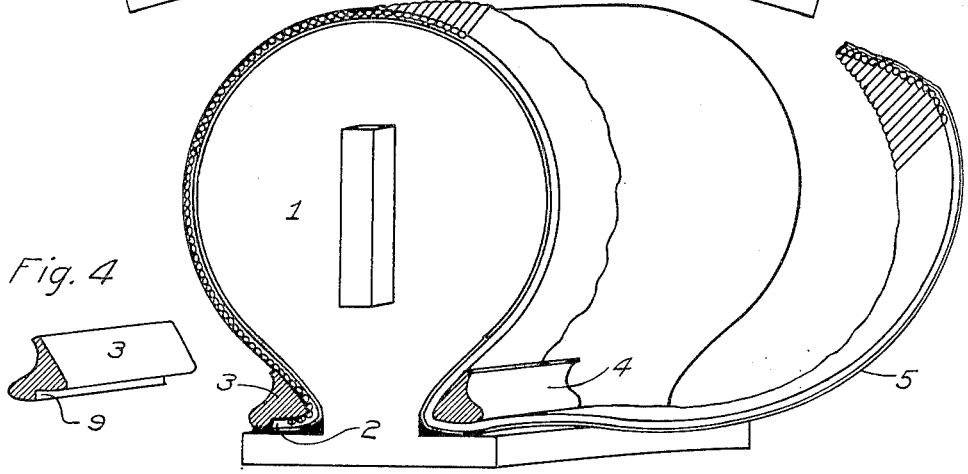
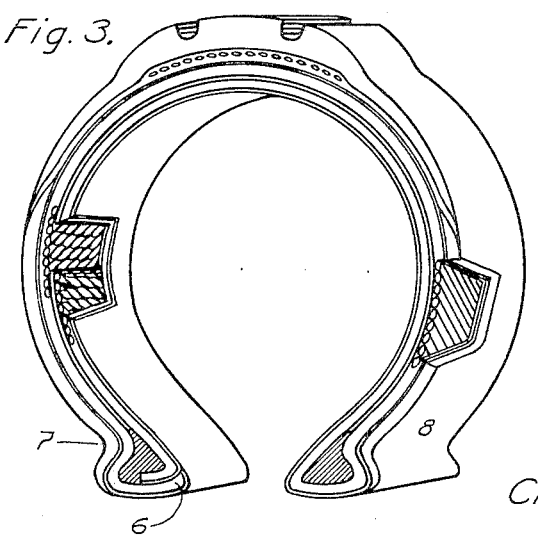
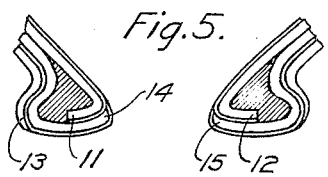
Inventor:
Clarence J. Drope.
By C. J. Enochs
Attorney.

UNITED STATES PATENT OFFICE.

CLARENCE J. DROPE, OF MINNEAPOLIS, MINNESOTA.

TIRE.

1,346,081.   Specification of Letters Patent.   Patented July 6, 1920.

Application filed February 8, 1919. Serial No. 275,903.

*To all whom it may concern:*

Be it known that I, CLARENCE J. DROPE, a citizen of the United States, and a resident of Minneapolis, in the county of Hennepin and State of Minnesota, have invented certain new and useful Improvements in Tires, of which the following is a specification.

The object of this invention is to provide an improved form of bead core for a pneumatic tire that is especially adapted for use with heavy fabric or cord tires of small sizes, and particularly for such tires as are used on automobiles of the type known as the Ford.

With this and incidental objects in view the invention consists of certain novel features of construction and combination of parts, the essential elements of which are hereinafter described with reference to the drawing which accompanies and forms a part of this specification.

In the drawing, Figure 1 is a perspective sectional view of a portion of a tire embodying my invention and showing the manner of starting the laying up of a sheet of cords to form a cord tire. Fig. 2 is a side elevation of a portion of a tire embodying my invention and showing the manner in which the cords traverse the tire carcass. Fig. 3 is a view similar to that shown in Fig. 1 but of the tire as completed. Fig. 4 is a fragmentary perspective detail of the improved form of bead core used in this invention. Fig. 5 is a fragmentary detail showing a modification of my invention.

In making up a tire embodying my invention, the tire is built up on a core 1, starting with a sheet of cord fabric at 2, on which is laid the circular bead core 3, preferably made of solid rubber.

The sheet of cords is brought around the tire at an angle of 45 degrees and the bead core 4 is placed as shown on the opposite side of the tire from the bead core 3, and the sheet of cords extending as shown at 5, Fig. 1, is brought back at the opposite 45 degree angle and ends at 6, Fig. 3, the outer portion of the cord sheet being brought in at 7 and 8 to form the portion that seats in and locks with the tire rim.

Looking at Fig. 4 it will be seen that the bead core 3 is of general triangular cross section but that a recess 9 runs about the inner portion of the bead core, and this recess is of such size and shape as to snugly receive the cord sheet at 2, Fig. 1.

It is evident that with the sheet started at 2 and brought around the tire as shown, with the bead core 4 holding the sheet on the opposite side from the starting end, that all possibility of any end of the cord sheet becoming loose in usage is obviated on the side carrying the bead core 4, and as the opposite end of the sheet locks over the starting end, as shown in Fig. 3, there is no free end of the cord at that side of the tire, so that neither side of the tire can be weakened by the loosening up of the cord ends, as is often the case in cord tires.

There are many ways of locking free ends of cord tires, some of which are fairly successful, but on tires of small sizes where the room possible for the beads is limited, these various methods of locking free ends I have found to be insecure and, in my experience, it has heretofore been impossible to make a satisfactory cord tire for automobiles of that type known as the Ford.

By shaping the bead core on one side as shown and described herein, and bringing the last end of the cord sheet around and locking it over the starting end of the cord sheet, I have devised a means of making a satisfactory cord tire of this type, and one that does not, at any time, loosen up at the ends of the cord sheet.

In the modification shown in Fig. 5 I use a bead core 10 on the right hand side of the tire, similar to the bead core 3 heretofore described, and in this modification, instead of using one sheet of cords, I start a single sheet at 11, Fig. 5, preferably running this at an angle of 45 degrees, and end the sheet at 12, where it is trimmed.

The second sheet 13 is started at 14 and brought around preferably at an angle of 45 degrees opposite to that of the first sheet and trimmed at 15.

It is to be understood that one of the main reasons why a bead core of this kind is necessary is that, in order to lock a tire under the rim, a certain amount of solid material in the bead core is necessary, and with a bead core of the style described and shown I get a maximum amount of material in the bead core while still maintaining a construction that locks the sheets.

While I have described my invention and illustrated it in two particular designs, I do not wish it understood that I limit myself to these constructions, as it is evident that the application of the invention may be varied in many ways within the scope of the following claims.

Claims:

1. In a tire the combination of a bead core of general triangular cross section and having a recess running along one of its surfaces, of a sheet of reinforcing material the starting end of which lies in said recess, said sheet passing around the tire, a second bead core positioned on the opposite side of the tire from said first named bead core, said sheet of fabric being brought around said second named bead core and passing under and trimmed under said first named bead core beyond the point where the starting end of said fabric sheet is positioned.

2. In a tire the combination, with a sheet of cords, of a bead core fashioned out along one edge to receive therein the starting edge of said sheet of cords, the finishing edge of said sheet of cords passing under the lower edge of said bead core and locking the starting ends of said sheet of cords.

3. In a tire the combination, with two bead cores, of a sheet of cords double on one side of the tire and inclosing one of said bead cores and having its ends both on the opposite side of the tire, one end being positioned in a recess in said bead core and the other end being positioned under said first named end to lock said first named end against said bead core.

4. As an article of manufacture a circular bead core for a tire having a general triangular shaped cross section and having a recess formed in one of its faces to receive the free end of a tire cord.

CLARENCE J. DROPE.